United States Patent
Morishima et al.

(10) Patent No.: US 11,192,313 B2
(45) Date of Patent: Dec. 7, 2021

(54) PRODUCTION METHOD FOR A PULTRUDED ARTICLE

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 289 days.

(21) Appl. No.: 16/313,305

(22) PCT Filed: Jun. 26, 2017

(86) PCT No.: PCT/JP2017/023447
§ 371 (c)(1),
(2) Date: Dec. 26, 2018

(87) PCT Pub. No.: WO2018/012270
PCT Pub. Date: Jan. 18, 2018

(65) Prior Publication Data
US 2020/0307127 A1  Oct. 1, 2020

(30) Foreign Application Priority Data
Jul. 14, 2016 (JP) .............................. JP2016-139726

(51) Int. Cl.
*B29C 70/52* (2006.01)
*B29K 77/00* (2006.01)
(Continued)

(52) U.S. Cl.
CPC ........ *B29C 70/521* (2013.01); *B29K 2023/06* (2013.01); *B29K 2077/00* (2013.01); *B29K 2105/12* (2013.01); *B29K 2307/04* (2013.01)

(58) Field of Classification Search
None
See application file for complete search history.

(56) References Cited

U.S. PATENT DOCUMENTS 3,657,040 A * 4/1972 Shobert ................. F41B 5/0005
156/178
3,669,821 A * 6/1972 Sharp ..................... B29C 65/14
428/184
(Continued)

FOREIGN PATENT DOCUMENTS

JP  H03500515 A  2/1991
JP  H06238758 A  8/1994
(Continued)

OTHER PUBLICATIONS

Extended European Search Report for European Application No. 17827400.7 dated Jun. 24, 2019; 8pp.
(Continued)

*Primary Examiner* — Edmund H Lee
(74) *Attorney, Agent, or Firm* — Hauptman Ham, LLP

(57) ABSTRACT

A method for producing a pultruded article includes: a step in which an activation sheet having a sliding surface capable of sliding with the inner surface of a mold is arranged on the surface of an intermediate molded article comprising reinforcing fibers that are impregnated with a thermosetting resin and the intermediate molded article and the activation sheet are introduced into a mold together; and a step in which a pultruded article generated by heating and hardening the intermediate molded article in the mold is pultruded together with the activation sheet from the mold.

8 Claims, 4 Drawing Sheets

(51) Int. Cl.
*B29K 105/12* (2006.01)
*B29K 307/04* (2006.01)

(56) References Cited

U.S. PATENT DOCUMENTS

| | | | | |
|---|---|---|---|---|
| 3,788,923 A * | 1/1974 | Soliman | ........... | B32B 15/085 |
| | | | | 156/246 |
| 4,151,031 A | 4/1979 | Goad et al. | | |
| 4,207,129 A * | 6/1980 | Tadewald | ........... | B29C 70/025 |
| | | | | 156/242 |
| 4,402,778 A * | 9/1983 | Goldsworthy | ........... | B29C 63/00 |
| | | | | 156/172 |
| 4,664,731 A | 5/1987 | Layden et al. | | |
| 4,828,897 A | 5/1989 | Staneluis et al. | | |
| 4,935,279 A * | 6/1990 | Perko | ........... | B29C 70/38 |
| | | | | 40/615 |
| 5,066,349 A * | 11/1991 | Perko | ........... | B29C 70/525 |
| | | | | 156/166 |
| 5,132,070 A * | 7/1992 | Paul | ........... | B29C 43/28 |
| | | | | 264/166 |
| 5,540,985 A * | 7/1996 | Kennedy, Jr. | ........... | B32B 27/12 |
| | | | | 442/321 |
| 5,653,923 A * | 8/1997 | Spoo | ........... | B29C 70/086 |
| | | | | 156/79 |
| 5,727,672 A * | 3/1998 | Foster | ........... | B29C 70/52 |
| | | | | 198/750.1 |
| 5,955,013 A | 9/1999 | Grinshpun et al. | | |
| 6,007,656 A * | 12/1999 | Heikkila | ........... | B29C 70/08 |
| | | | | 156/172 |
| 2010/0266833 A1* | 10/2010 | Day | ........... | B29C 70/865 |
| | | | | 428/304.4 |
| 2011/0162777 A1* | 7/2011 | Youn | ........... | B32B 27/20 |
| | | | | 156/62.2 |
| 2013/0318908 A1* | 12/2013 | Holley | ........... | E04C 2/296 |
| | | | | 52/741.4 |
| 2014/0246145 A1* | 9/2014 | Kurtz | ........... | B32B 37/06 |
| | | | | 156/244.23 |
| 2015/0376946 A1* | 12/2015 | Kurzer | ........... | B29C 65/70 |
| | | | | 182/194 |
| 2018/0036970 A1* | 2/2018 | Chmielewski | ........... | B29C 70/521 |

FOREIGN PATENT DOCUMENTS

| | | |
|---|---|---|
| JP | 2002520200 A | 7/2002 |
| JP | 2012045795 A | 3/2012 |

OTHER PUBLICATIONS

International Search Report and Written Opinion for International Application No. PCT/JP2017/023447 dated Aug. 1, 2017; 14pp.

* cited by examiner

PRODUCTION METHOD FOR A PULTRUDED ARTICLE

RELATED APPLICATIONS

The present application is a National Phase of International Application Number PCT/JP2017/023447 filed Jun. 26, 2017 and claims priority from Japanese Application Number 2016-139726 filed Jul. 14, 2016.

TECHNICAL FIELD

The present invention relates to a production method and a production device for a pultruded article.

BACKGROUND ART

A composite material obtained by mixing a reinforcing fiber with a plastic material is used for aircrafts, automobiles, and ships. As a method for molding the composite material, the following method is known such as a sheet winding molding method in which a prepreg sheet wound around a mandrel is heated and cured for molding and the mandrel is pultruded after the molding, and a press molding in which a plurality of the prepreg sheets are heated and pressurized for molding after being stacked one on another (refer to PTL 1 and PTL 2). In addition, as another method for molding the composite material, the following pultrusion method is known. An intermediate molded article having the reinforcing fiber impregnated with a thermosetting resin is introduced into a mold. The intermediate molded article is heated, cured, and the composite material is pultruded from the mold.

CITATION LIST

Patent Literature

[PTL 1] Japanese Unexamined Patent Application Publication No. 2012-045795
[PTL 2] Japanese Unexamined Patent Application Publication No. 06-238758

SUMMARY OF INVENTION

Technical Problem

According to the pultrusion method, a mold releasing agent is included in advance in the thermosetting resin of the intermediate molded article in order to release a pultruded article from the mold. After the intermediate molded article is heated and cured, if the mold releasing agent remains on a surface of the pultruded article, joining strength between the pultruded article and other components is weakened. Therefore, in a case where the pultruded article and other components are joined to each other, it is necessary to carry out work for improving the joining strength, such as work for removing the mold releasing agent from the surface of the pultruded article before a joining step. If the number of steps increases due to this work, manufacturing cost increases.

The present invention aims to provide a production method and a production device for a pultruded article, which can compatibly achieve mold releasing ability from a mold and joining strength acting on other components while suppressing an increase in manufacturing cost.

Solution to Problem

According to the present invention, there is provided a production method for a pultruded article. The production method includes a step of locating an activation sheet having a sliding surface slidable on an inner surface of a mold on a surface of an intermediate molded article having a reinforcing fiber impregnated with a thermosetting resin and introducing the intermediate molded article into the mold together with the activation sheet, and a step of pultruding a pultruded article produced by heating and curing the intermediate molded article in the mold, from the mold, together with the activation sheet.

In the present invention, it is preferable that the activation sheet has an activation surface which comes into contact with the surface of the intermediate molded article, and that a frictional force between the activation surface and the surface of the intermediate molded article is stronger than a frictional force between the sliding surface and the inner surface of the mold.

In the present invention, it is preferable that surface roughness of the activation surface is greater than surface roughness of the sliding surface.

In the present invention, it is preferable that the activation surface includes at least one of a nylon resin and a polyethylene resin, and that the sliding surface includes at least one of a fluororesin and a silicone resin.

In the present invention, it is preferable that the intermediate molded article is continuously introduced into the mold, and that the activation sheet is introduced into the mold in synchronization with the intermediate molded article.

In the present invention, it is preferable that the activation sheet is joined to the surface of the intermediate molded article in an entrance of the mold.

In the present invention, it is preferable that the activation sheet is joined to an entire surface of the intermediate molded article to be introduced into the mold. However, the activation sheet may be joined to a portion of the surface of the intermediate molded article, for example, only a surface of the intermediate molded article which serves as a surface joined to the other component in a case where the pultruded article is joined to the other component in a subsequent step.

According to the present invention, there is provided a production device for a pultruded article. The production device includes an activation sheet supply unit that supplies an activation sheet having a sliding surface slidable on an inner surface of a mold to a surface of an intermediate molded article having a reinforcing fiber impregnated with a thermosetting resin, and a pultrusion device that pultrudes a pultruded article produced by heating and curing the intermediate molded article introduced into the mold together with the activation sheet, from the mold, together with the activation sheet.

Advantageous Effects of Invention

According to the present invention, there are provided a production method and a production device for a pultruded article, which can compatibly achieve mold releasing ability from a mold and joining strength acting on other components while suppressing an increase in manufacturing cost.

DESCRIPTION OF EMBODIMENTS

Hereinafter, embodiments according to the present invention will be described with reference to the drawings. However, the present invention is not limited thereto. Configuration elements in the embodiments described below can be appropriately combined with each other. In some cases, some of the configuration elements may not be used.

[Production Device for Pultruded Article]

Figure 1:
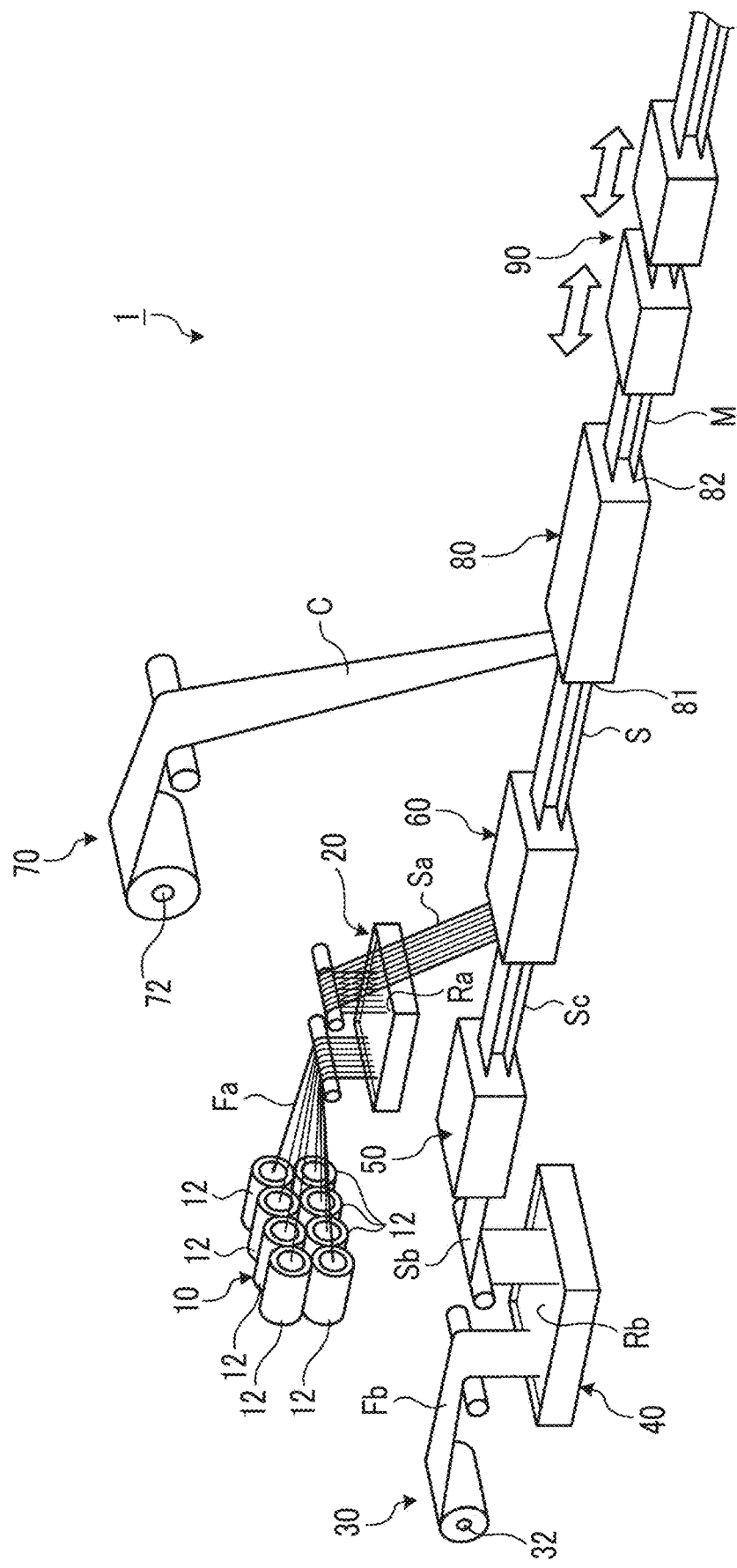
FIG. 1 is a view schematically illustrating an example of a production device for a pultruded article according to the present embodiment.

FIG. 1 is a view schematically illustrating an example of a production device 1 for a pultruded article M according to the present embodiment. The production device 1 produces the pultruded article M by pultruding an intermediate molded article S having a reinforcing fiber impregnated with a thermosetting resin.

As illustrated in FIG. 1, the production device 1 includes a reinforcing fiber supply unit 10 that supplies a reinforcing fiber Fa, a resin tank 20 that produces an intermediate molded article Sa by impregnating the reinforcing fiber Fa with a thermosetting resin Ra, a preform supply unit 30 that supplies a preform Fb, a resin tank 40 that produces an intermediate molded article Sb by impregnating the preform Fb with a thermosetting resin Rb, a first preforming mold 50 that produces an intermediate molded article Sc by preliminarily forming the intermediate molded article Sb produced in the resin tank 40, a second preforming mold 60 that produces the intermediate molded article S by preliminarily forming the intermediate molded article Sc preliminarily formed in the first preforming mold 50 and the intermediate molded article Sa produced in the resin tank 20, an activation sheet supply unit 70 that supplies an activation sheet C to a surface of the intermediate molded article S produced in the second preforming mold 60, a heating mold 80 into which the intermediate molded article S and the activation sheet C produced in the second preforming mold 60 are introduced so as to heat and cure the intermediate molded article S in the heating mold 80, and a pultrusion device 90 that pultrudes the pultruded article M produced by heating and curing the intermediate molded article S in the heating mold 80, from the heating mold 80.

The reinforcing fiber supply unit 10 supplies the reinforcing fiber Fa. In the present embodiment, the reinforcing fiber Fa is a carbon fiber. The reinforcing fiber Fa may be at least any one of a plastic fiber, a glass fiber, and a metal fiber.

The reinforcing fiber supply unit 10 has a plurality of bobbins 12. The continuous reinforcing fiber sheet Fa is wound around each of the plurality of bobbins 12. The reinforcing fiber supply unit 10 feeds the reinforcing fiber sheet Fa out from each of the plurality of bobbins 12.

The resin tank 20 impregnates the reinforcing fiber Fa supplied from the reinforcing fiber supply unit 10 with the thermosetting resin Ra. The resin tank 20 includes a container filled with the thermosetting resin Ra. The resin tank 20 accommodates the thermosetting resin Ra in a softened state.

The thermosetting resin in the softened state is in a state before the thermosetting resin is heated and cured, and means a state where the thermosetting reaction is available by heating the thermosetting resin. The thermosetting resin in the softened state does not have the self-supporting capability, and cannot hold a shape in the state without being supported by a support.

The thermosetting resin Ra adheres to the reinforcing fiber Fa by causing the reinforcing fiber Fa to pass through the resin tank 20. In the present embodiment, the thermosetting resin Ra includes an epoxy resin. The thermosetting resin Ra may be at least any one of an unsaturated polyester resin, a vinyl ester resin, a phenolic resin, a polyurethane resin, and a silicone resin.

The preform supply unit 30 supplies the preform Fb. The preform Fb is a sheet having the reinforcing fiber which is not impregnated with the thermosetting resin. In the present embodiment, the reinforcing fiber for forming the preform Fb is the carbon fiber. The reinforcing fiber for forming the preform Fb may be at least any one the plastic fiber, the glass fiber, and the metal fiber.

The preform supply unit 30 has a supply reel 32. The continuous preform Fb is wound around the supply reel 32 in a roll shape. The preform supply unit 30 feeds the preform Fb out from the supply reel 32.

The resin tank 40 impregnates the preform Fb supplied from the preform supply unit 30 with the thermosetting resin Rb. The resin tank 40 includes a container filled with the thermosetting resin Rb. The resin tank 40 accommodates the thermosetting resin Rb in a softened state.

The thermosetting resin Rb adheres to the preform Fb by causing the preform Fb to pass through the resin tank 40. In the present embodiment, the thermosetting resin Rb includes the epoxy resin. The thermosetting resin Ra may be at least any one of the unsaturated polyester resin, the vinyl ester resin, the phenolic resin, the polyurethane resin, and the silicone resin.

The first preforming mold 50 preliminarily forms the intermediate molded article Sb serving as the preform Fb supplied from the preform supply unit 30 and impregnated with the thermosetting resin Rb in the resin tank 40. The first preforming mold 50 preliminarily forms a shape of the intermediate molded article Sb before the molding using the heating mold 80.

The first preforming mold 50 heats the intermediate molded article Sb so that the thermosetting resin Rb included in the intermediate molded article Sb is brought into a semi-cured state. The first preforming mold 50 heats the intermediate molded article Sb so as to produce the intermediate molded article Sc including the thermosetting resin Rb in the semi-cured state.

The thermosetting resin in the semi-cured state means that the state is harder than a softened state but is not a completely cured state, and means a state where thermosetting reaction is available by heating the thermosetting resin. The thermosetting resin in the semi-cured state has self-supporting capability, and can hold a shape even in a state without being supported by the support.

The second preforming mold 60 preliminarily forms the intermediate molded article Sc including the thermosetting resin Rb in the semi-cured state which is produced in the first preforming mold 50, and the intermediate molded article Sa serving as the reinforcing fiber Fa supplied from the reinforcing fiber supply unit 10 and impregnated with the thermosetting resin Ra in the resin tank 20. The intermediate molded article Sc from the first preforming mold 50 and the intermediate molded article Sa from the resin tank 20 are supplied to the second preforming mold 60. The intermediate molded article Sa and the intermediate molded article Sc are combined with each other in the second preforming mold 60. The intermediate molded article Sa includes the thermosetting resin Ra in a softened state, and the intermediate molded article Sc includes the thermosetting resin Rb in a semi-cured state. The second preforming mold 60 preliminarily forms a shape of the intermediate molded article Sa and the intermediate molded article Sb before the molding using the heating mold 80.

The second preforming mold 60 heats the intermediate molded article Sa and the intermediate molded article Sc so that the thermosetting resin Ra included in the intermediate molded article Sa is brought into the semi-cured state. The second preforming mold 60 heats the intermediate molded article Sa and the intermediate molded article Sc so as to produce the intermediate molded article S including the thermosetting resin Ra and the thermosetting resin Rb in the semi-cured state.

The intermediate molded article S produced in the second preforming mold 60 is supplied to the heating mold 80. The intermediate molded article S includes those in which the reinforcing fiber Fa is impregnated with the thermosetting resin Ra and those in which the preform Fb serving as the reinforcing fiber is impregnates with the thermosetting resin Rb. The thermosetting resin included in the intermediate molded article S is in the semi-cured state.

The activation sheet supply unit 70 supplies the activation sheet C having the sliding surface slidable on the inner surface of the heating mold 80 to the surface of the intermediate molded article S to be supplied to the heating mold 80. The activation sheet supply unit 70 supplies the activation sheet C to the surface of the intermediate molded article S before the intermediate molded article S is introduced into the heating mold 80.

The activation sheet supply unit 70 has a supply reel 72. The continuous activation sheet C is wound around the supply reel 72 in a roll shape. The activation sheet supply unit 70 feeds the activation sheet C out from the supply reel 72.

The heating mold 80 has a heater which heats and cures the intermediate molded article S supplied from the second preforming mold 60. The heating mold 80 heats the intermediate molded article S so that the thermosetting resin in the semi-cured state included in the intermediate molded article S is brought into the cured state.

The thermosetting resin in the cured state is in a state after the thermosetting resin is heated and cured, and means a state where the thermosetting reaction is not available even by heating the thermosetting resin. The thermosetting resin in the cured state has the self-supporting capability, and can hold the shape even in the state without being supported by the support.

The thermosetting resin included in the intermediate molded article S is heated and cured in the heating mold 80, thereby forming the pultruded article M.

The heating mold 80 has an entrance 81 of the intermediate molded article S and an exit 82 of the pultruded article M produced in the heating mold 80. The intermediate molded article S supplied from the second preforming mold 60 is introduced into the heating mold 80 via the entrance 81.

In the present embodiment, the activation sheet supply unit 70 supplies the activation sheet C to the entrance 81 of the heating mold 80. The activation sheet C supplied to the entrance 81 of the heating mold 80 from the activation sheet supply unit 70 is introduced into the heating mold 80 together with the intermediate molded article S via the entrance 81. The activation sheet C is joined to the surface of the intermediate molded article S in the entrance 81 of the heating mold 80. The activation sheet C in a state where the activation sheet C is located on the surface of the intermediate molded article S is introduced into the heating mold 80 together with the intermediate molded article S.

The pultrusion device 90 pultrudes the pultruded article M from the heating mold 80. In the present embodiment, the pultrusion device 90 pultrudes the pultruded article M produced by the heating and curing the intermediate molded article S introduced into the heating mold 80 together with the activation sheet C, from the heating mold 80 together with the activation sheet C.

In the present embodiment, the activation sheet C continuously come into contact with the surface of the pultruded article M in both cases, such as when the activation sheet C joined to the surface of the intermediate molded article S in the entrance 81 passes through the inside of the heating mold 80, and after the activation sheet C leaves out from the exit 82 of the heating mold 80. In a state where the activation sheet C is joined to the surface of the pultruded article M, the pultrusion device 90 pultrudes the pultruded article M together with the activation sheet C from the heating mold 80.

In the present embodiment, the reinforcing fiber Fa is continuously supplied from the reinforcing fiber supply unit 10. The preform Fb is continuously supplied from the preform supply unit 30. The intermediate molded article S is continuously introduced into the heating mold 80 from the entrance 81 of the heating mold 80. The pultrusion device 90 continuously pultrudes the pultruded article M. That is, in the present embodiment, the production device 1 performs continuous pultrusion.

The activation sheet C is continuously supplied from the activation sheet supply unit 70. The activation sheet C is continuously introduced into the heating mold 80 from the entrance 81 of the heating mold 80. The activation sheet C is introduced into the heating mold 80 in synchronization with the intermediate molded article S.

[Activation Sheet]

Figure 2:
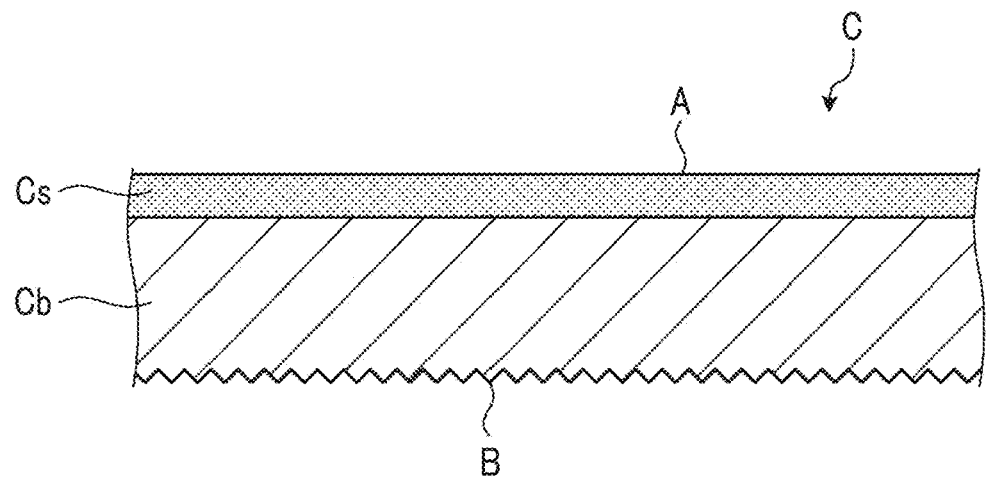
FIG. 2 is a sectional view schematically illustrating an example of an activation sheet according to the present embodiment.

FIG. 2 is a sectional view schematically illustrating an example of the activation sheet C according to the present embodiment. As illustrated in FIG. 2, the activation sheet C has a sliding surface A facing the inner surface of the heating mold 80 in a state where the activation sheet C is located on the surface of the intermediate molded article S, and an activation surface B which comes into contact with the surface of the intermediate molded article S. The sliding surface A is slidable on the surface of the heating mold 80. The activation surface B suppresses inactivation of the surface of the produced pultruded article M, thereby preventing the joining strength from being weakened.

The activation sheet C has a base material Cb and a sliding layer Cs disposed on one surface of the base material Cb. The sliding surface A is the surface of the sliding layer Cs. The activation surface B is the other surface of the base material Cb.

The activation surface B includes a thermoplastic resin. In the present embodiment, the activation surface B includes at least one of a nylon resin and a polyethylene resin. The activation surface B may be at least any one of a polypropylene resin, a polystyrene resin, a polyamide resin, a polyacetal resin, a polycarbonate resin, and a polyimide resin.

In the present embodiment, the base material Cb is a nylon resin sheet. The activation surface B is the surface formed of the nylon resin sheet. The base material Cb may be a polyethylene resin sheet. The base material Cb may be at least any one of a polypropylene resin sheet, a polychlorinated vinyl resin sheet, a polystyrene resin sheet, a polyamide resin sheet, a polyacetal resin sheet, a polycarbonate resin sheet, and a polyimide resin sheet.

The sliding surface A includes at least one of a fluororesin and a silicone resin.

In the present embodiment, the sliding layer Cs is formed by coating one surface of the base material Cb with a material including the fluororesin or the silicone resin. In the present embodiment, one surface of the base material Cb is coated with polytetrafluoroethylene (PTFE), thereby forming the sliding layer Cs. A polytetrafluoroethylene sheet adheres to the base material Cb, thereby forming the sliding layer Cs. The sliding layer Cs may not be the polytetrafluoroethylene. One surface of the base material Cb may be coated with a silicone resin composition so as to form the sliding layer Cs.

Also, surface roughness of the activation surface B is greater than surface roughness of the sliding surface A. In the present embodiment, the sliding surface A is a smooth surface, and the activation surface B is a rough surface.

The thickness of the activation sheet C is appropriately set so as not to hinder molding performance of the pultruded article M and to such an extent that the activation sheet C can withstand a pultruding force of the heating mold 80. For example, in a case where the activation sheet C is formed by coating the nylon resin sheet with the polytetrafluoroethylene, the thickness of the activation sheet C is set to be in a range of 10 [μm] to 1,000 [mm].

Figure 3:
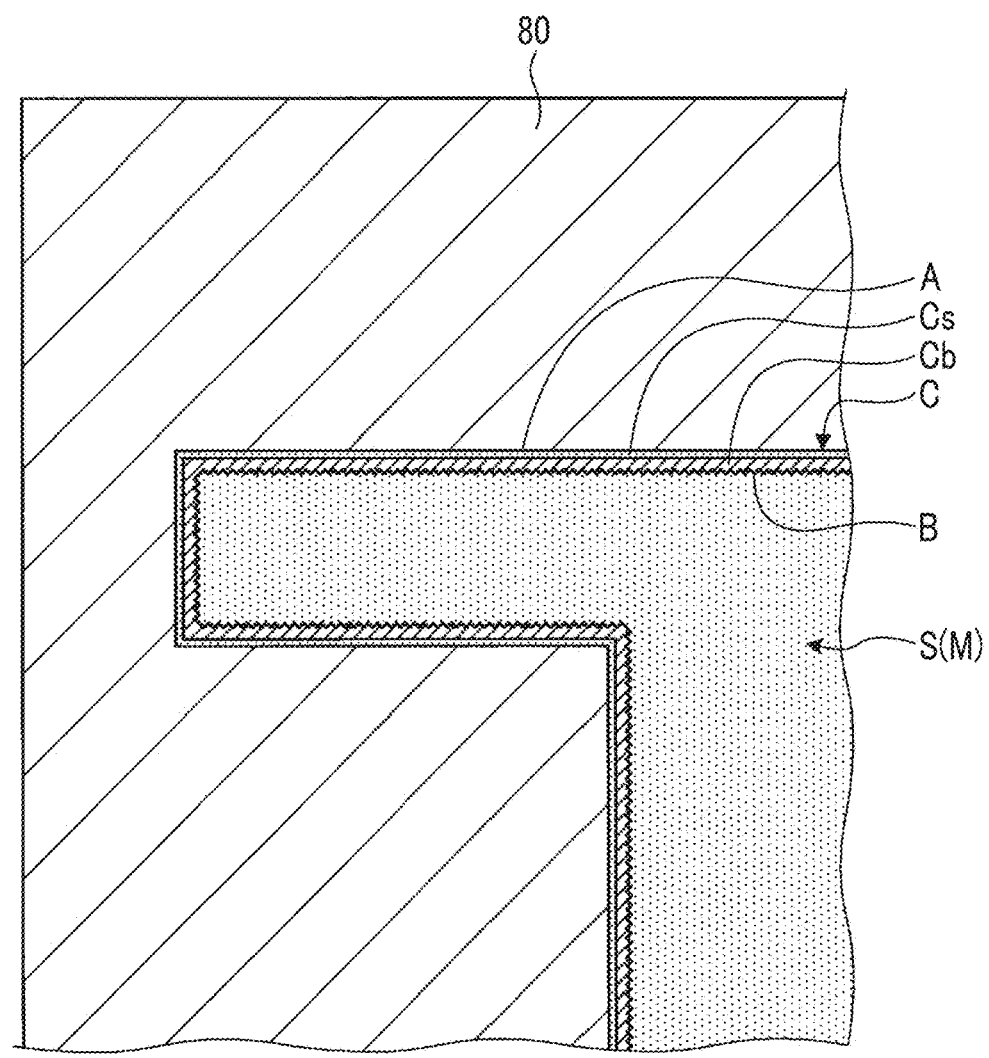
FIG. 3 is a sectional view schematically illustrating a relationship among a heating mold, an intermediate molded article, and the activation sheet according to the present embodiment.

FIG. 3 is a sectional view schematically illustrating a relationship among the heating mold 80, the intermediate molded article S, and the activation sheet C according to the present embodiment. As illustrated in FIG. 3, the activation sheet C is located on the surface of the intermediate molded article S so that the sliding surface A faces the inner surface of the heating mold 80 after the activation surface B and the surface of the intermediate molded article S come into contact with each other.

The thermosetting resin of the intermediate molded article S is in the semi-cured state. Accordingly, the surface roughness of the activation surface B is transferred to the surface of the intermediate molded article S. In a state where the surface of the intermediate molded article S is in contact with the activation surface B of the activation sheet C, the intermediate molded article S is heated and cured in the heating mold 80. In this manner, the surface of the pultruded article M is changed to the rough surface.

The activation surface B of the activation sheet C which comes into contact with the surface of the intermediate molded article S is the rough surface. The sliding surface A of the activation sheet C which comes into contact with the inner surface of the heating mold 80 is the smooth surface, and includes the fluororesin or the silicone resin. In the present embodiment, a frictional force between the activation surface B and the surface of the intermediate molded article S is stronger than a frictional force between the sliding surface A and the inner surface of the heating mold 80.

Figure 4:
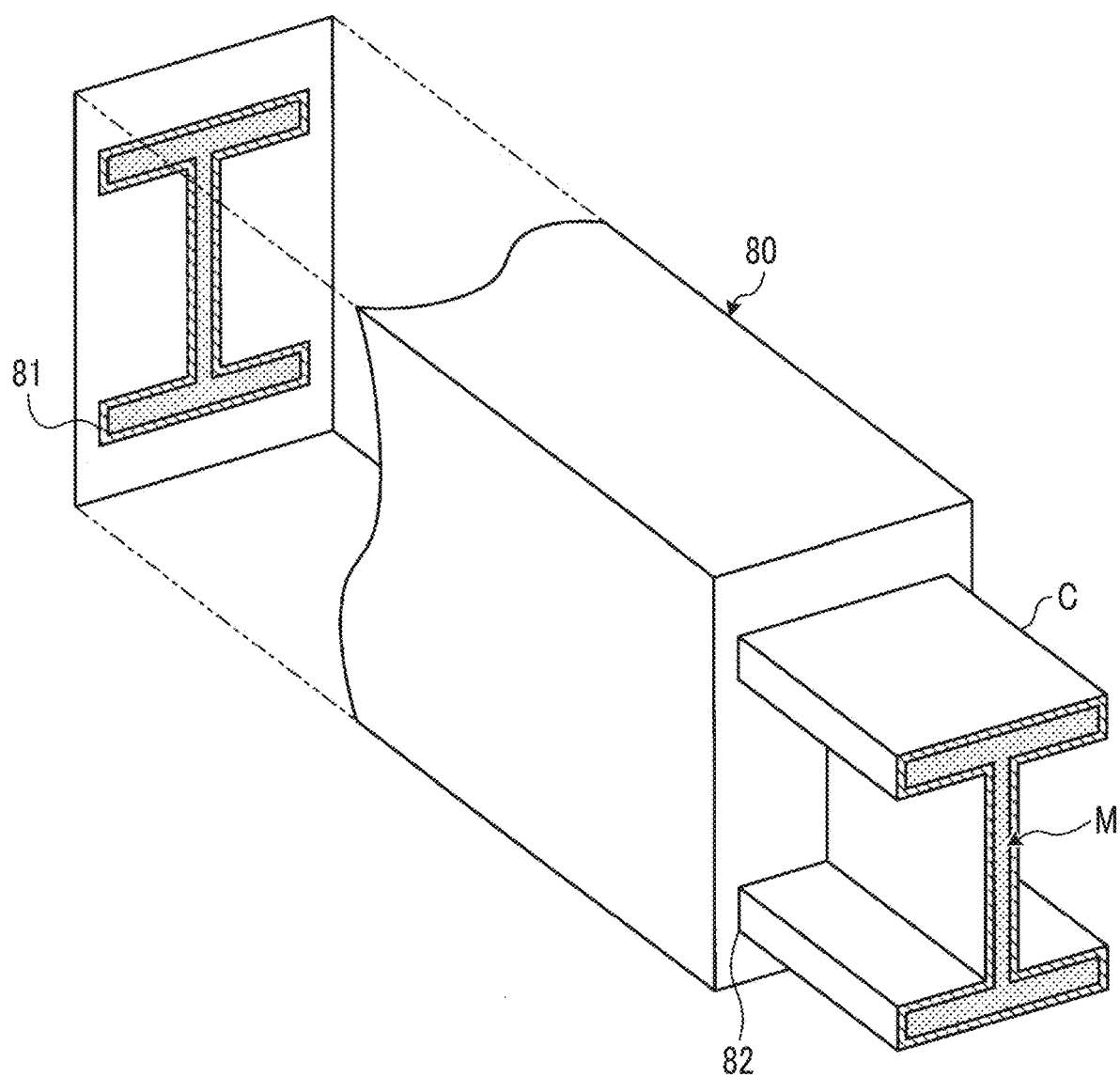
FIG. 4 is a perspective view schematically illustrating a relationship among the heating mold, a pultruded article, and the activation sheet according to the present embodiment.

FIG. 4 is a perspective view schematically illustrating a relationship among the heating mold 80, the pultruded article M, and the activation sheet C according to the present embodiment. The activation sheet C is joined to the entire surface of the intermediate molded article S introduced into the heating mold 80 from the entrance 81. The activation sheet C is located between the inner surface of the heating mold 80 and the surface of the intermediate molded article S inside the heating mold 80. As illustrated in FIG. 4, even in a case where the pultruded article M has a plurality of corner portions, a bent portion, and a planar portion, the activation sheet C is bent along the outer shape of the pultruded article M, and is joined to the entire surface of the pultruded article M.

[Production Method for Pultruded Article]

Figure 5:
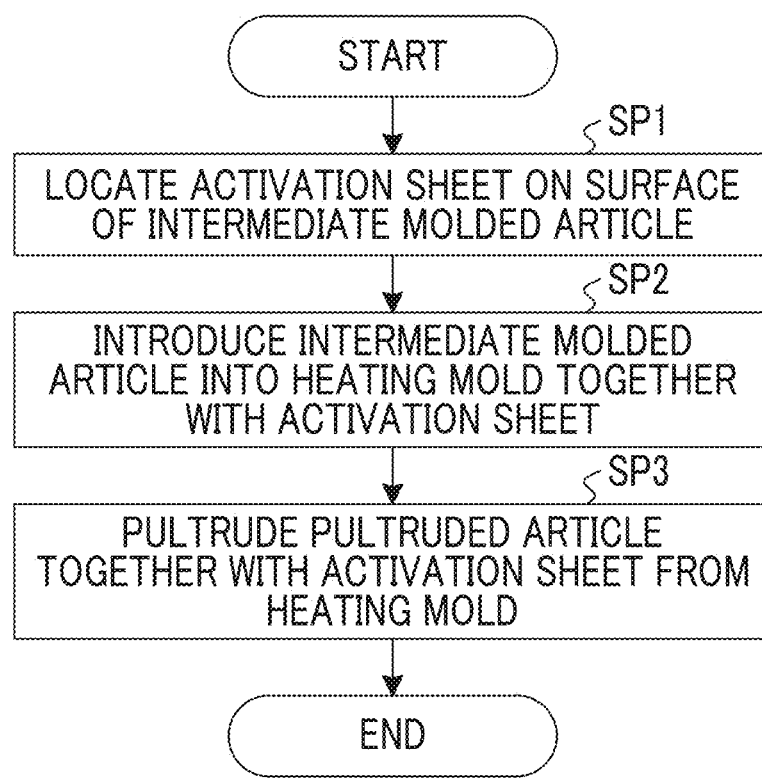
FIG. 5 is a flowchart illustrating an example of a production method for a pultruded component according to the present embodiment.

Next, a production method for the pultruded article M according to the present embodiment will be described. FIG. 5 is a flowchart illustrating an example of the production method for the pultruded article M according to the present embodiment.

The reinforcing fiber Fa supplied from the reinforcing fiber supply unit 10 is impregnated with the thermosetting resin Ra in the resin tank 20 so as to produce the intermediate molded article Sa. In addition, the preform Fb supplied from the preform supply unit 30 is impregnated with the thermosetting resin Rb in the resin tank 40 so as to produce the intermediate molded article Sb. The intermediate molded article Sb is preliminarily formed in the first preforming mold 50 so as to produce the intermediate molded article Sc.

The intermediate molded article Sa and the intermediate molded article Sc are supplied to the second preforming mold 60. The intermediate molded article Sa and the intermediate molded article Sc are preliminarily formed in the second preforming mold 60 so as to produce the intermediate molded article S. The thermosetting resin of the intermediate molded article S is in the semi-cured state.

The activation sheet C having the sliding surface A slidable on the inner surface of the heating mold 80 is located on the surface of the intermediate molded article S (Step SP1). The activation sheet C is joined to the surface of the intermediate molded article S so that the activation surface B comes into contact with the surface of the intermediate molded article S, and the sliding surface A comes into contact with the inner surface of the heating mold 80.

The activation sheet C is joined to the entire surface of the intermediate molded article S introduced into the heating mold 80 in the entrance 81 of the heating mold 80.

The intermediate molded article S is introduced into the heating mold 80 from the entrance 81 together with the activation sheet C (Step SP2). The intermediate molded article S introduced into the heating mold 80 moves inside the heating mold 80 toward the exit 82 together with the activation sheet C.

The sliding surface A of the activation sheet C is very slidable on the inner surface of the heating mold 80. Since the activation sheet C is slidable, the intermediate molded article S covered with the activation sheet C can smoothly move inside the heating mold 80.

The intermediate molded article S is heated in the heating mold 80 so as to cure the thermosetting resin of the intermediate molded article S. The intermediate molded article S is heated and cured so as to form the pultruded article M.

In the present embodiment, the frictional force between the activation surface B of the activation sheet C and the surface of the intermediate molded article S is stronger than the frictional force between the sliding surface A of the activation sheet C and the inner surface of the heating mold 80. Since the frictional force is stronger between the activation surface B of the activation sheet C and the surface of the intermediate molded article S, when the intermediate molded article S and the activation sheet C move together inside the heating mold 80, the intermediate molded article S and the activation sheet C are prevented from being deviated from each other, or the activation sheet C is prevented from being twisted. In addition, the frictional force is smaller between the sliding surface A of the activation sheet C and the inner surface of the heating mold 80. Accordingly, the slidability of the activation sheet C slidable on the inner surface of the heating mold 80 is improved. Therefore, the intermediate molded article S and the activation sheet C can smoothly move relative to the heating mold 80.

The pultruded article M produced by heating and curing the intermediate molded article S in the heating mold 80 is pultruded together with the activation sheet C from the heating mold 80 by the pultrusion device 90 (Step SP3). The pultruded article M is pultruded from the heating mold 80 in a state where the pultruded article M is covered with the activation sheet C.

In each case such as when the intermediate molded article S moves inside the heating mold 80 and when the pultruded article M leaves out from the exit 82 of the heating mold 80, the activation sheet C is continuously located on the surface of the intermediate molded article S and the surface of the pultruded article M. Therefore, the slidability of the activation sheet C slidable on the inner surface of the heating mold 80 allows the intermediate molded article S and the pultruded article M to be smoothly released from the heating mold 80.

In addition, in the present embodiment, the entire surface of the intermediate molded article S moving inside the heating mold 80 is covered with the activation sheet C. In this manner, the inner surface of the heating mold 80 and the intermediate molded article S are prevented from coming into contact with each other. Therefore, mold releasing ability is sufficiently achieved by the activation sheet C.

While the produced pultruded article M is covered with the activation sheet C, the pultruded article M is transported to a subsequent step such as a cutting step. Even after the pultruded article M is pultruded from the heating mold 80, a state where the activation sheet C is located on the surface of the pultruded article M is maintained, and the pultruded article M is protected by the activation sheet C. In this manner, the surface of the pultruded article M is prevented from being damaged, foreign substances are prevented from adhering to the surface of the pultruded article M, or the joining strength of the surface of the pultruded article M is prevented from being weakened. In addition, in the present embodiment, the entire surface of the pultruded article M is covered with the activation sheet C, and the pultruded article M is sufficiently protected by the activation sheet C.

When the pultruded article M and other components are joined to each other, the activation sheet C is detached from the pultruded article M. In the present embodiment, when the thermosetting resin of the intermediate molded article S is in the semi-cured state, the activation sheet C is joined to the intermediate molded article S. Therefore, the surface roughness of the activation surface B of the activation sheet C is transferred to the surface of the pultruded article M, and the surface of the pultruded article M is in a state where the joining strength is strong. When the activation sheet C is detached from the pultruded article M, there appears a surface of the activated pultruded article M whose surface roughness is greatly activated. The surface of the pultruded article M whose surface roughness is activated can be joined with other components by using the strong joining strength using an anchor effect.

[Operation and Advantageous Effect]

As described above, according to the present embodiment, in a state where the activation sheet C is located on the surface of the intermediate molded article S, the intermediate molded article S and the activation sheet C are introduced together into the heating mold 80, and are pultruded together from the heating mold 80. Therefore, the slidability of the activation sheet C slidable on the inner surface of the heating mold 80 allows the pultruded article M to be smoothly released from the heating mold 80.

In addition, the intermediate molded article S and the activation sheet C are pultruded together from the heating mold 80, and the activation sheet C continuously located on the surface of the pultruded article M, thereby allowing the surface of the pultruded article M to be protected by the activation sheet C. In this manner, the surface of the pultruded article M is prevented from being damaged, foreign substances are prevented from adhering to the surface of the pultruded article M, or the joining strength of the surface of the pultruded article M is prevented from being weakened.

In addition, even if the mold releasing agent is not previously included in the thermoplastic resin of the intermediate molded article S, the activation sheet C allows mold releasing ability from the heating mold 80. Therefore, even if work for improving the joining strength is not carried out as in the related art, the surface of the pultruded article M having satisfactory joining strength can be obtained simply by detaching the activation sheet C from the pultruded article M. Therefore, while an increase in manufacturing cost is suppressed, it is possible to produce the pultruded article M which compatibly achieves the mold releasing ability from the heating mold 80 and the joining strength acting on other components.

In addition, in the present embodiment, the frictional force between the activation surface B of the activation sheet C and the surface of the intermediate molded article S is stronger than the frictional force between the sliding surface A of the activation sheet C and the inner surface of the heating mold 80. In this manner, the intermediate molded article S and the activation sheet C are prevented from being deviated inside the heating mold 80, or the activation sheet C is prevented from being twisted. While the intermediate molded article S and the activation sheet C can be moved together while the activation sheet C and the heating mold 80 are allowed to slide.

In addition, according to the present embodiment, the surface roughness of the activation surface B is greater than the surface roughness of the sliding surface A. In this manner, the frictional force between the activation surface B and the surface of the intermediate molded article S can be sufficiently greater than the frictional force between the sliding surface A and the inner surface of the heating mold 80. In addition, the surface roughness of the activation surface B is transferred to the surface of the pultruded article M. In this manner, the surface of the pultruded article M having the great surface roughness can be obtained by detaching the activation sheet C from the pultruded article M. The surface of the pultruded article M having the great surface roughness can obtain improved joining strength by using the anchor effect.

According to the present embodiment, the activation surface B includes at least one of the nylon resin and the polyethylene resin, and the sliding surface A includes at least one of the fluororesin and the silicone resin. As the base material Cb of the activation sheet C, the nylon resin sheet or the polyethylene resin sheet is used. Accordingly, it is possible to obtain the activation sheet C having the strength which can withstand the pultruding force. In addition, the base material Cb of the activation sheet C is coated with the mold releasing agent including the fluororesin or the silicone resin is coated, or a releasing sheet including the fluororesin or the silicone resin adheres to the base material Cb of the activation sheet C. In this manner, the activation sheet C can sufficiently obtain the mold releasing ability.

In addition, according to the present embodiment, the production device 1 performs the continuous pultrusion. The intermediate molded article S is continuously introduced into the heating mold 80, and the activation sheet C is introduced into the heating mold 80 in synchronization with the intermediate molded article S. In a case where the continuous pultrusion is performed so as to continuously introduce the intermediate molded article S into the heating mold 80, the activation sheet C is continuously introduced into the heating mold 80 in synchronization with the intermediate molded article S. In this manner, during the continuous pultrusion, it is possible to always obtain the sufficient mold releasing ability. Therefore, the continuous pultrusion can be smoothly performed. In addition, the pultruded article M subjected to the continuous pultrusion is covered with and protected by the activation sheet C.

In addition, in the present embodiment, after the intermediate molded article Sa and the intermediate molded article Sc are preliminarily formed by the second preforming mold 60 so as to produce the intermediate molded article S, in the entrance 81 of the heating mold 80, the surface of the intermediate molded article S and the activation sheet C are joined to each other. In this manner, the activation sheet C can be joined to the intermediate molded article S in a final form after being preliminarily formed. In addition, the activation sheet C can be joined to the intermediate molded article S in the semi-cured state after being preliminarily formed. Accordingly, for example, compared to a case where the activation sheet C is joined to the intermediate molded article S in the softened state, the joining step can be smoothly performed. In addition, the activation sheet C is joined to the intermediate molded article S in the semi-cured state. In this manner, the surface roughness of the activation surface B can be satisfactorily transferred to the surface of the pultruded article M.

In addition, in the present embodiment, the activation sheet C is joined to the entire surface of the intermediate molded article S introduced into the heating mold 80. In this manner, the intermediate molded article S and the inner surface of the heating mold 80 are prevented from coming into contact with each other. Accordingly, it is possible to sufficiently obtain the mold releasing ability. In addition, the entire surface of the produced pultruded article M is covered with the activation sheet C. Therefore, the pultruded article M is sufficiently protected by the activation sheet C.

Other Embodiments

In the above-described embodiment, the sliding surface A is set to be the smooth surface, and the activation surface B is set to be the rough surface. Both the sliding surface A and the activation surface B may be the smooth surfaces, and both the sliding surface A and the activation surface B may be the rough surfaces. In addition, in the above-described embodiment, the surface roughness of the activation surface B is set to be greater than the surface roughness of the sliding surface A. The surface roughness of the sliding surface A and the surface roughness of the activation surface B may be substantially the same as each other. The surface roughness of the sliding surface A may be greater than the surface roughness of the activation surface B.

In the above-described embodiment, the activation sheet C is joined to the surface of the intermediate molded article S in the entrance 81 of the heating mold 80. The activation sheet C and the intermediate molded article S may be joined to each other at any desired position between the exit of the second preforming mold 60 for molding the intermediate molded article S in the final form and the entrance 81 of the heating mold 80.

In the above-described embodiment, the activation sheet C is joined to the entire surface of the intermediate molded article S introduced into the heating mold 80. The activation sheet C may be joined to a portion of the intermediate molded article S introduced into the heating mold 80. For example, the activation sheet C may be joined to only a region to be joined to other components on the surface of the intermediate molded article S.

In the above-described embodiment, the first preforming mold 50 and the second preforming mold 60 are used in order to mold the intermediate molded article S and the intermediate molded article Sc. The first preforming mold 50 and the second preforming mold 60 may be omitted. In this case, the intermediate molded article Sa, the intermediate molded article Sb, and the activation sheet C are all directly introduced into the heating mold 80.

In the above-described embodiment, a step is performed in which the reinforcing fiber Fa and the preform Fb are used and impregnated with the thermosetting resin Ra and the thermosetting resin Rb. The reinforcing fiber Fa and the preform Fb may be replaced with the prepreg. In this case, a resin impregnation step can be omitted. Accordingly, the resin tank 20 and the resin tank 40 may not be used. The prepreg serving as the intermediate molded article Sa and the intermediate molded article Sb is directly introduced into the heating mold 80 without any change.

In the above-described embodiment, the reinforcing fiber Fa and the preform Fb are used. Only one of the reinforcing fiber Fa and the preform Fb may be used.

REFERENCE SIGNS LIST 1 production device,
10 reinforcing fiber supply unit,
12 bobbin,
20 resin tank,
30 preform supply unit,
32 supply reel,
40 resin tank,
50 first preforming mold,
60 second preforming mold,
70 activation sheet supply unit,
72 supply reel,
80 heating mold,
81 entrance,
82 exit,
90 pultrusion device,
A sliding surface,
B activation surface,
C activation sheet,
Cb base material,
Cs sliding layer,
Fa reinforcing fiber,
Fb preform,
M pultruded article,
Ra thermosetting resin,
Rb thermosetting resin, S intermediate molded article,
Sa intermediate molded article,
Sb intermediate molded article,
Sc intermediate molded article

The invention claimed is:

1. A production method for a pultruded article, the method comprising:
    introducing, into a preforming mold, an intermediate molded article having a reinforcing fiber impregnated with a thermosetting resin;
    pultruding, from the preforming mold, a semi-cured intermediate molded article formed by heating the intermediate molded article in the preforming mold and having a plurality of corners;
    locating an activation sheet which has a sliding surface slidable on an inner surface of a mold and which is bendable along an outer shape of the semi-cured intermediate molded article to cover the semi-cured intermediate molded article with the activation sheet so that the activation sheet is joined to an entire surface of the semi-cured intermediate molded article, and introducing the semi-cured intermediate molded article into the mold together with the activation sheet; and
    pultruding a pultruded article together with the activation sheet from the mold, in a state where an entire surface of the pultruded article having the plurality of corner portions and being produced by heating and curing the semi-cured intermediate molded article in the mold is joined to the activation sheet and the pultruded article is covered with the activation sheet,
    wherein the activation sheet is detachable from the pultruded article.

2. The production method for a pultruded article according to claim 1,
    wherein the activation sheet has an activation surface which comes into contact with the surface of the semi-cured intermediate molded article, and
    wherein a frictional force between the activation surface and the surface of the semi-cured intermediate molded article is stronger than a frictional force between the sliding surface and the inner surface of the mold.

3. The production method for a pultruded article according to claim 2,
    wherein surface roughness of the activation surface is greater than surface roughness of the sliding surface, and
    wherein the surface roughness of the activation surface is transferred to the surface of the semi-cured intermediate molded article.

4. The production method for a pultruded article according to claim 2,
    wherein the activation surface includes at least one of a nylon resin and a polyethylene resin, and
    wherein the sliding surface includes at least one of a fluororesin and a silicone resin.

5. The production method for a pultruded article according to claim 1,
    wherein the semi-cured intermediate molded article is continuously introduced into the mold, and
    wherein the activation sheet is introduced into the mold in synchronization with the semi-cured intermediate molded article.

6. The production method for a pultruded article according to claim 1,
    wherein the activation sheet is joined to the surface of the semi-cured intermediate molded article in an entrance of the mold.

7. The production method for a pultruded article according to claim 1,
    wherein the activation sheet is joined to all or a portion of the surface of the semi-cured intermediate molded article to be introduced into the mold.

8. The production method for a pultruded article according to claim 1, further comprising detaching the activation sheet from the pultruded article.

* * * * *